Nov. 5, 1929. C. E. S. PLACE 1,734,445
LOCK NUT FOR BOLTS AND THE LIKE
Filed Nov. 2, 1926
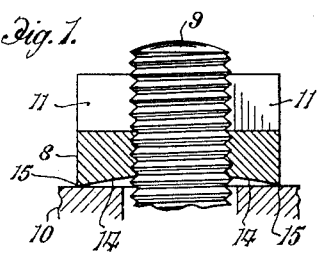
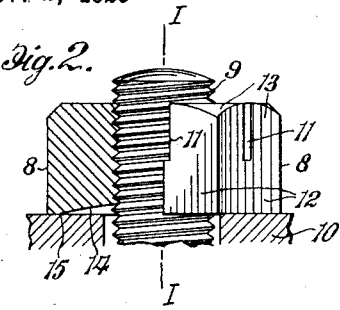
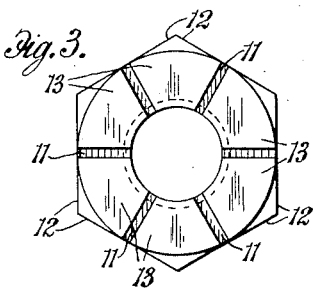
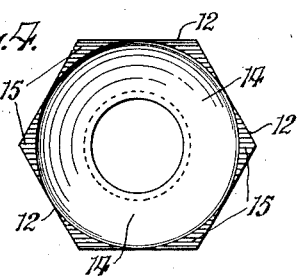
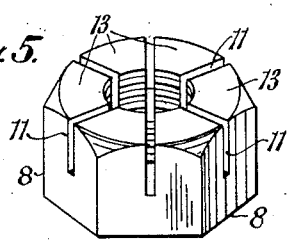
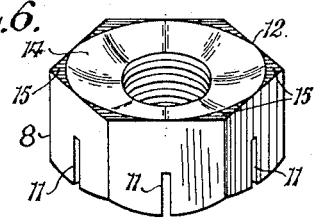
Inventor:
Charles E. S. Place Patented Nov. 5, 1929

1,734,445

UNITED STATES PATENT OFFICE

CHARLES EDWARD STEWART PLACE, OF MANCHESTER, ENGLAND, ASSIGNOR OF ONE-HALF TO SAM FOSTER MARSDEN, OF MANCHESTER, ENGLAND

LOCK NUT FOR BOLTS AND THE LIKE

Application filed November 2, 1926, Serial No. 145,729, and in Great Britain November 4, 1925.

This invention has reference to lock-nuts for bolts and the like, and has for its object to provide an improved lock-nut which will be efficient in use and cheap to manufacture.

According to this invention a nut for screw bolts and the like is divided at its outer end into a plurality of sector-like parts and its inner end or base is so formed that when the nut is tightened up on the bolt or the like the pressure of the base of the nut against the part against which it bears causes the sector-like parts to firmly grip the shank of the bolt or the like.

One form of lock-nut in accordance with the invention is illustrated in the accompanying drawings wherein Fig. 1 is a vertical section taken on the line I—I of Fig. 2, which shows in part section and part elevation a lock-nut tightened upon a bolt, stud or the like. Figs. 3 and 4 are respectively plans of the upper and undersides of the lock-nut. Figs. 5 and 6 are respectively perspective views of the upper and under sides of the lock-nut.

Referring first to Figs. 1 to 4, 8 represents the lock-nut screwed upon a bolt or stud 9 against the part 10. The lock-nut 8 is divided from its outer end and for approximately one half of its height or length by radial saw cuts 11 across each pair of "flats" or side faces 12 to form a corresponding plurality of sector-like portions or castellations 13 somewhat similar to those of a castellated nut. The under surface or base of the nut is circularly dished or hollowed at 14 within the side faces 12 to form a narrow bearing surface 15 which is continuous at the periphery and in the angles between the "flats" or side faces 12.

When the nut constructed as described is tightened upon a bolt or the like 9 it is found that the action of the narrow peripherally continuous bearing surface 15 aforesaid in bearing against the part 10 against which the nut abuts, is to cause the sector-like portions 13 to bear radially inwards and tightly grip the shank of the bolt or the like 9 sufficiently to prevent the nut from slackening back under vibration without, however, interfering with the removal of the nut by means of a spanner or wrench in the ordinary way.

While, as illustrated in the drawings, the narrow peripherally continuous bearing surface 15 is shown as reduced substantially to an angular edge at the middle of the lower edge of the side faces 12, this bearing surface may be somewhat wider in a continuous plane if desired, the diameter of the dished portion 14 then being proportionally slightly less, and the invention has been thus successfully carried out in actual practice. In any case, the angle formed at the outer edge of the dished portion 14 forms a continuous circular fulcrum which bears against the surface of the part 10. The circular or peripheral continuity of the bearing surface 15 is perhaps best brought out in Fig. 1.

With a lock nut constructed in this way, that is, with a continuous circular or annular bearing surface, it has been found in practice that great strength and resiliency are afforded, by reason of the fact that the bearing pressure against the under side of the nut is distributed substantially equally in a continuous manner circularly around the periphery of the nut without being localized at any particular segregated point. Accordingly, with a nut of this construction it has been found that the slight distortion thereof necessarily produced in its locking action is only what may be called temporary or only while the nut is in a locked condition such as when tightly screwed down upon the bolt 9 against the surface of the part 10. As soon as this nut is loosened or unscrewed its resiliency immediately causes it to be restored to its original or initial form, without leaving therein a permanent set or distortion. Therefore, and as has been found to be the case, the nut of this invention may be screwed down to its locking position and unscrewed or loosened repeatedly, the useful life of the nut being limited only by the wearing of its thread.

What I claim as my invention and desire to secure by Letters Patent is:—

1. A lock-nut for screw bolts and the like divided at its outer end by radial saw cuts or grooves perpendicular to each of its side faces to form sector-like portions or castellations equal in number to the number of side faces, the under side of said nut being dished to form a continuous circular fulcrum bearing surface at the peripheral edge of the dish, said nut having a bore formed with a spiral thread of uniform depth.

2. The invention defined in claim 1, in which there is provided a plane under surface extending outward from and surrounding the fulcrum formed by the peripheral edge of the dish so that thereby a bearing surface of greater width is formed in the angles between the side faces.

In witness whereof I have hereunto set my hand.

CHARLES EDWARD STEWART PLACE.